(12) United States Patent
Heuschmid

(10) Patent No.: US 7,566,670 B2
(45) Date of Patent: Jul. 28, 2009

(54) AIRBAG FABRIC

(75) Inventor: Rainer Heuschmid, Ulm (DE)

(73) Assignee: Takata-Petri AG, Aschaffenburg (DE)

( * ) Notice: Subject to any disclaimer, the term of this patent is extended or adjusted under 35 U.S.C. 154(b) by 654 days.

(21) Appl. No.: 11/406,407

(22) Filed: Apr. 19, 2006

(65) Prior Publication Data

US 2006/0240729 A1   Oct. 26, 2006

(30) Foreign Application Priority Data

Apr. 20, 2005 (DE) ............... 10 2005 019 228

(51) Int. Cl.
D03D 15/00 (2006.01)
(52) U.S. Cl. ............. 442/181; 280/730.2; 280/728.1; 139/389
(58) Field of Classification Search ............... None
See application file for complete search history.

(56) References Cited

U.S. PATENT DOCUMENTS

| | | | |
|---|---|---|---|
| 5,208,097 A | 5/1993 | Honma et al. | |
| 5,277,966 A | 1/1994 | Nakayama et al. | |
| 5,280,952 A | 1/1994 | Hirabayashi et al. | |
| 5,501,259 A | 3/1996 | Palm | |
| 5,524,926 A | 6/1996 | Hirai et al. | |
| 5,713,598 A | 2/1998 | Morita et al. | |
| 5,833,265 A | 11/1998 | Seymour | |
| 6,000,442 A * | 12/1999 | Busgen | 139/389 |
| 6,177,365 B1 | 1/2001 | Li | |
| 6,177,366 B1 | 1/2001 | Li | |
| 6,264,234 B1 | 7/2001 | Hill et al. | |

FOREIGN PATENT DOCUMENTS

| | | |
|---|---|---|
| DE | 42 41 694 A1 | 6/1993 |
| DE | 43 07 921 A1 | 9/1993 |
| DE | 195 13 297 A1 | 11/1995 |
| DE | 198 06 301 A1 | 9/1998 |
| EP | 1 291 248 A2 | 3/2003 |
| GB | 2 289 653 A | 11/1995 |
| WO | WO 03/051681 A1 | 6/2003 |

OTHER PUBLICATIONS

Stein, James et al., "Recent Developments in Inflatable Airbag Impact Attenuation Systems for Mars Exploration", ILC Dover, Inc., 8 pgs.

* cited by examiner

*Primary Examiner*—Arti Singh-Pandey
(74) *Attorney, Agent, or Firm*—Foley & Lardner LLP

(57) ABSTRACT

An airbag fabric including a tear resistant structure is provided. The tear resistant structure may include tear resisting threads positioned parallel to the warp and weft threads. The tear resistant structure may also include a plurality of tear barriers positioned on the fabric in separate island shaped structures.

20 Claims, 3 Drawing Sheets

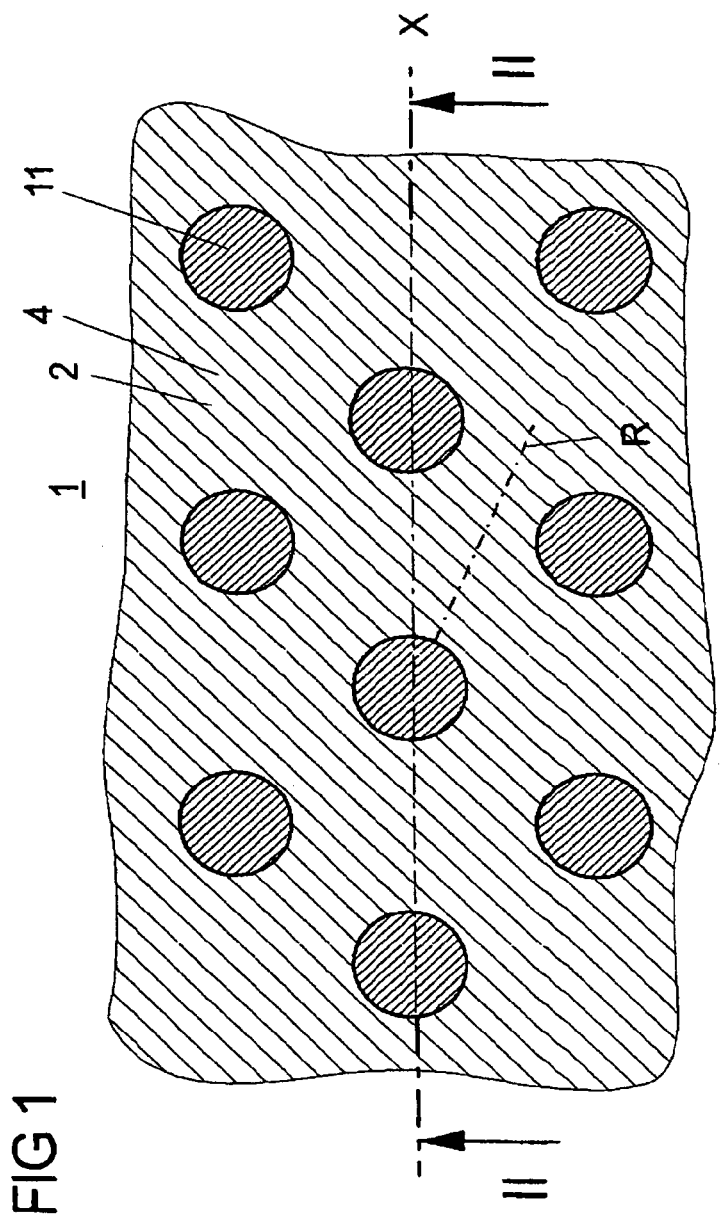
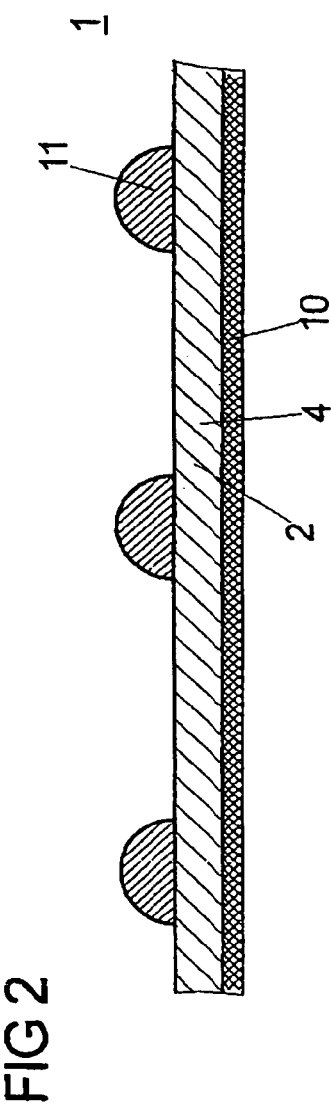

AIRBAG FABRIC

BACKGROUND

Airbag fabrics can be inflated in or on motor vehicles in order to protect a person. The fabric in this case forms an airbag envelope capable of being filled with gas.

Due to the ever-increasing range of use of airbags, the conditions under which these are used are also increasingly more difficult and more material-intensive. For example, in the exterior region of motor vehicles, an airbag fabric has to satisfy ever higher requirements in terms of its resistance.

At the same time, the aim is to produce airbag modules which have as small a build as possible. For this purpose, the folded airbag must have as small a surface spread as possible, so that the volume of the airbag in the folded state is as small as possible.

Possible causes for loss of pressure durability of an airbag in crash situations are often cuts or tears caused by sharp-edged fragments, for example fragments of a window pane of the motor vehicle which may act during a crash on the deployed (inflated) airbag, and also the friction of the airbag on abrasive contact surfaces, for example road asphalt. It is therefore difficult to implement restraint systems with sufficiently long pressure durability in the range of seconds.

U.S. Pat. No. 6,264,234 (incorporated by reference herein) discloses a side airbag module, with an airbag which is deployed between a lateral vehicle body and the vehicle occupant in the event of a crash. The airbag itself is constructed in two layers and includes a gas-tight inner bladder which can be filled with a flow medium in order to deploy the airbag, and also an outer resistant envelope for protecting the fillable inner bladder. In this case, however, there is the disadvantage that the airbag has overall a relatively high surface spread due to the additional protective outer envelope.

SUMMARY

According to a disclosed embodiment an airbag fabric comprising warp and weft threads is provided. The fabric includes a first tear resisting thread positioned parallel to the warp threads and a second tear resisting thread positioned parallel to the weft threads. The cross-sectional area of each of the first and second tear resisting threads is greater than the cross-sectional area of each of the warp and weft threads.

According to another embodiment, an airbag fabric including a mesh of warp and weft threads, and a plurality of tear barriers positioned on the threads is provided. The fabric is configured so that of the tear barriers is a separate island shaped structure.

According to yet another embodiment, an airbag is provided. The airbag includes a woven fabric including warp and weft threads and a tear barrier including elastic material applied to a surface of the fabric in a plurality of island-shaped structures. The elastic material may be applied at nodes of a geometric grid.

Another embodiment includes an airbag comprising a woven fabric including warp and weft threads, and a first tear resisting thread positioned parallel to the warp threads and a second tear resisting thread positioned parallel to the weft threads. The threads are configured so that the cross-sectional area of each of the first and second tear resisting threads is greater than the cross-sectional area of each of the warp and weft threads.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 1 shows a top view of a detail of a particularly preferred variant of a fabric according to one embodiment of the present invention for an airbag with island-shaped reinforcing structures;

FIG. 2 shows a cross section along the line II-II from FIG. 1;

DESCRIPTION

Figure 3:
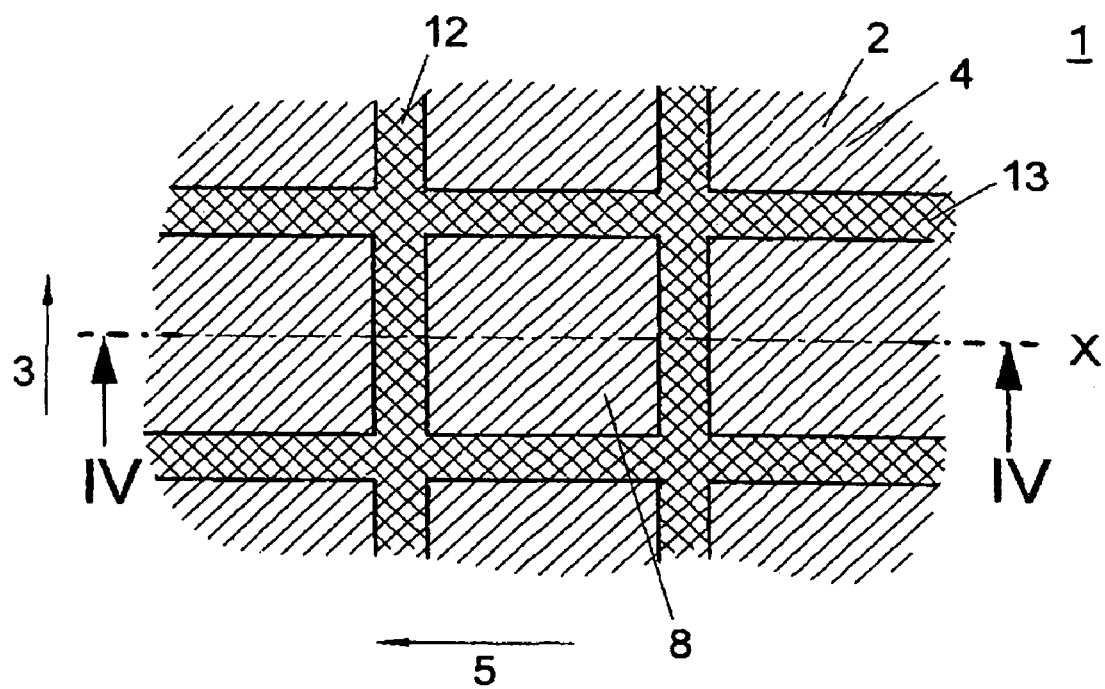
FIG. 3 shows a top view of a detail of an alternative variant of a fabric according to one embodiment of the present invention for an airbag with longitudinally extending reinforcing structures in the form of tear barriers.

According to one embodiment of the present invention, there is provision for providing the fabric with additional reinforcing structures.

In this way, the function can be achieved whereby tears cannot occur or crash-induced tears cannot be propagated, unimpeded, in the fabric of the airbag, since the additional reinforcing structures prevent a continuing tearing-open of the fabric and protect the fabric against abrasion. The pressure durability of the airbag is thereby decisively improved at least in the time range of seconds.

Preferably, the reinforcing structures are designed as tear barriers and preferably have a structure which acts as abrasion protection, that is to say as protection against frictional actions.

In a particularly preferred variant of one embodiment of the present invention, the fabric has reinforcing structures consisting of an elastic material, the elastic material preferably being a known silicone. Such reinforcing structures are preferably applied to the fabric.

Preferably, in this case, the reinforcing structures have a surface facing away from the fabric which at least partially has a convex curvature in a cross section running perpendicularly with respect to the plane of extent.

In an alternative exemplary embodiment of the present invention, the fabric has additional threads as reinforcing structures. In this case, the fabric preferably has at least one first sort of warp threads running parallel to one another and one first sort of weft threads running transversely thereto. The warp and weft threads may be connected to one another in a known way, for example by a linen weave. Such reinforcing structures in the form of tear barriers serve particularly for protection against tears or for preventing an expansion of a tear.

Preferably, the fabric has a further, second sort of warp threads with a cross-sectional area which is greater than the cross-sectional area of the first sort of warp threads. In this case, the second sort may consist of the same material as the first sort. Preferably, the second sort of warp threads is more resistant than the first sort, for example due to a particular material composition. Furthermore the fabric preferably has a further, second sort of weft threads which is more resistant than the first sort of weft threads. Preferably, the fabric has tear barriers in the form of warp threads and/or weft threads of the second sort described above.

Preferably, the airbag fabric includes a fine structure which is protected by a coarser reinforcing structure. The fine structure of the fabric arises due to an interweaving of threads in the process of producing the fabric and is formed, for example, by warp and weft threads which are interwoven by a known weave, for example a simple linen weave. It is also conceivable, instead of a fabric, to use a film-like sheet structure for an airbag and to provide it correspondingly with additional tear barriers.

Preferably, as compared with the fine structure, the reinforcing structure is more resistant and/or a coarser structure which is arranged on the fabric in a network-like or punctiform (spatially recurring) manner. In this way, as compared with a full coating, both a weight advantage and an advantage in terms of the surface spread of the fabric are afforded. An increased resistance of the reinforcing structure in relation to the fine structure may be achieved, for example, by using a correspondingly more resistant material.

Preferably, the reinforcing structures are formed so as to extend longitudinally and run in the plane of extent of the fabric. Thus, tears with propagation directions having a component perpendicular to a longitudinal extent direction of the reinforcing structures can be stopped by the reinforcing structures. By the reinforcing structures being arranged along various directions, a delimitation of tears in respect of all possible propagation directions of tears can advantageously be achieved.

In a variant of the present invention, therefore, the reinforcing structures run, extended longitudinally, along the edges of a regular (imaginary) grid and thus form individual cells, beyond which a tear cannot be propagated.

In a particularly preferred exemplary embodiment of the invention, the reinforcing structures are arranged in island form, preferably the reinforcing structures having a circular contour parallel to the plane of extent of the fabric. A contour of a reinforcing structure is understood to mean its border in a plane lying parallel to the plane of extent of the fabric. The island-shaped arrangement means, in particular, that the individual (island-shaped) reinforcing structures are not connected to one another.

This proves advantageous particularly with regard to the foldability of the fabric, since a rigidity of the fabric can increase only locally in the region of the island-shaped reinforcing structures.

Preferably, the island-shaped reinforcing structures project in the form of rounded elevations perpendicularly with respect to the plane of extent of the fabric. This is advantageous, since the fabric can thereby be protected particularly from abrasive actions, that is to say from forces, the direction of which is oriented parallel to the plane of extent of the fabric, since those act first on the projecting reinforcing structures.

Preferably, the reinforcing structures are arranged in island form on the nodes or so as to extend longitudinally along the edges of a regular grid. The grid is preferably a rectangular grid, a square grid, a hexagonal grid (honeycomb structure) or a triangular grid.

FIG. 1 shows a top view of a sheet-like fabric 1 for an airbag with a plane of extent which coincides with the paper plane according to one embodiment of the present invention. The fabric 1 has first warp and first weft threads 2, 4 which are interwoven by a known linen weave and, in particular, form a fine structure. For the sake of clarity in FIG. 1, the known first warp and first weft threads 2, 4 are not illustrated in FIG. 1, and this also applies to FIGS. 2, 3, and 4.

The fabric 1 illustrated in FIG. 1 has reinforcing structures in the form of tear barriers 11 as additional components of the fabric 1, which consist of an elastic material, for example of a known silicone, and are applied to the fabric. The tear barriers 11 have a circular contour in a plane lying parallel to a plane of extent of the fabric 1 and are island-shaped, that is to say the tear barriers 11 form individual unconnected islands, are arranged on the nodes of a triangular grid and thus form a coarse structure which is coarser than the fine structure formed by the first warp and weft threads 2, 4. A coarser structure is in this context understood to mean a structure which is composed of spatially recurring irreducible elements, the geometric dimensions of which are larger than those of the irreducible elements of the fine structure to be compared. It is clear, however, that a distinction can even be made between a fine and a coarse structure, without the structures considered being of a spatially periodic type. With regard to the fabric illustrated in FIG. 1, for example, the coarse structure of the tear barriers 11 is determined by the spacing of adjacent nodes of the triangular grid, on which the island-shaped tear barriers 11 are arranged, whereas the fine structure of the fabric 1 is determined by the comparatively smaller spacing of adjacent fabric nodes at which, in the case of a linen weave of first warp and first weft threads 2, 4, the first warp and first weft threads 2, 4 cross one another.

It is clear that tear barriers in the form of additional threads in the fabric 1 and tear barriers in the form of additional applied material can be combined.

The tear barriers 11 illustrated in FIG. 1 serve for stopping tear expansions in the plane of extent of the fabric 1. This is illustrated diagrammatically by a tear R (dashed and dotted line) which has a linear tear expansion directed towards a tear barrier 11. Furthermore, the island-shaped tear barriers 11 serve for protection against abrasive actions on the fabric, that is to say the tear barriers 11 have a configuration such that they serve as abrasion protection, as may be gathered from FIG. 2.

FIG. 2 shows a cross section through the fabric 1, described in FIG. 1, of an airbag. The sectional plane X runs along the dashed line II-II of FIG. 1 and in FIG. 1 is perpendicular to the paper plane. In FIG. 2, the plane of extent of the fabric 1 is perpendicular to the paper plane, in contrast to FIG. 1. Individual tear barriers 11 project in each case from the fabric 1 in a direction running perpendicularly with respect to the plane of extent, and thereby protect the fine structure 2, 4, described in FIG. 1, of the fabric 1 against the frictional actions.

Furthermore, the fabric 1 has, on a surface facing away from the tear barriers 11 and running in the plane of extent of the fabric 1, a known coating 10 which is formed on the area on one side and which is not illustrated in FIG. 1 and serves for sealing off the fabric 1, so that a gas-tight envelope of the airbag can be formed by the fabric 1.

FIG. 3 shows a top view of a fabric 1 of the type described in FIGS. 1 and 2 according to one embodiment of the present invention, with a plane of extent lying in the paper plane. In contrast to FIGS. 1 and 2, however, the protective reinforcing structure is not formed by island-shaped tear barriers 11, but instead by first and second tear barriers 12, 13 which are applied to the surface of the fabric 1 and consist of an elastic material, preferably of a known silicone. In this case, for example, an adhesive bond may be present between the fabric 1 and the first and the second tear barriers 12, 13. The first tear barriers 12 in this case run, extended longitudinally, parallel to one another and along a first longitudinal extent direction 3 which lies in the planar extent of the fabric 1. The first tear barriers 12 are arranged equidistantly in a direction oriented perpendicularly to the longitudinal extent direction 3. The second tear barriers 13 likewise run parallel to one another and, extended longitudinally, along a second longitudinal extent direction 5 which lies in the plane of extent of the fabric 1 and is perpendicular to the first longitudinal extent direction 3. The second tear barriers 13 are likewise arranged equidistantly (with respect to the first longitudinal extent direction 3).

The spacing between two adjacent first tear barriers 12 perpendicular to their first longitudinal extent direction 3 is equal to the spacing of two adjacent second tear barriers 13 perpendicular to their second longitudinal extent direction 5, so that crossing first and second tear barriers 12, 13 form the edges of a square grid and the first and second tear barriers 12, 13 in each case crossing one another at the nodes of the square grid. Crossing is understood in this context to mean a mutual abutment of the first and second tear barriers 12, 13 at the nodes of the square grid. The first and the second tear barriers 12, 13 thus form square first cells 8, from which a crash-induced tear R in the fabric 1 cannot break out, since the first and second tear barriers 12, 13 are set up and provided for preventing an expansion of the tear R beyond the border of the first cell 8 (to be precise, the first and second tear barriers 12, 13).

It is conceivable, besides a combination of the first and second tear barriers 12, 13, to form solely first tear barriers 12 or solely second tear barriers 13 on the fabric 1.

Figure 4:
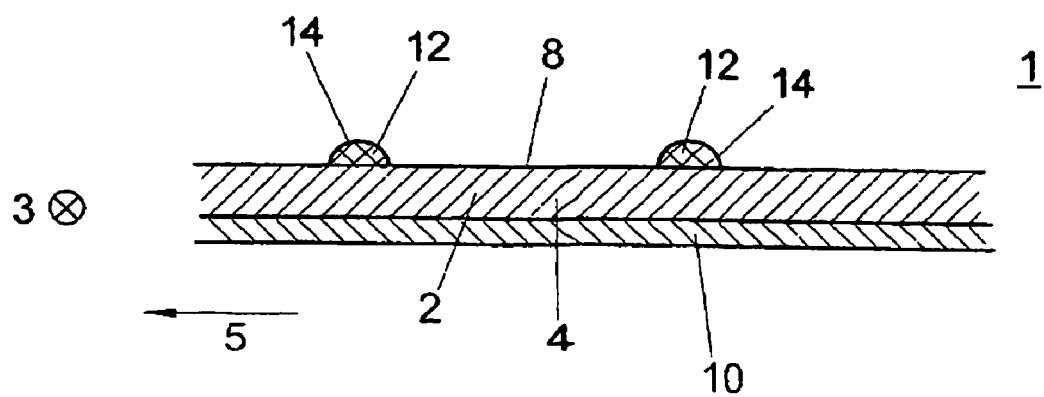
FIG. 4 shows a cross section along the line IV-IV from FIG. 3.

FIG. 4 shows a cross section through the fabric 1, described in FIG. 3, of an airbag according to one embodiment of the present invention. The sectional plane X in this case runs along the dashed line IV-IV of FIG. 3 and in FIG. 3 is perpendicular to the plane of extent of the fabric 1 and runs parallel to the second tear barriers 13, in particular between two second tear barriers 13. The sectional plane X correspondingly intersects the first tear barriers 12 perpendicularly to their first longitudinal extent direction 3.

Additionally to FIG. 3, FIG. 4 shows that the first tear barriers 12 (and also the second tear barriers 13 not shown) have, on the far side of the nodal points of the arrangement of the first and second tear barriers 12, 13 which is described in FIG. 3 and is in the manner of a square grid, surfaces 14 which face away from a surface of the fabric 1 and which have a convex curvature in a sectional plane X running perpendicularly with respect to the first longitudinal extent direction 3. Such a geometry can be implemented particularly simply in the process of producing the fabric 1. Other geometries, for example rectangular cross sections of the tear barriers 12, 13, may likewise be envisaged.

The individual first tear barriers 12 (and the second tear barriers 13 not shown) in each case project from the fabric 1 in a direction running perpendicularly with respect to the plane of extent of the fabric 1 and thereby protect the fine structure 2, 4, described in FIG. 1, of the fabric 1 against the frictional actions, that is to say, in the event of a frictional action on the fabric 1, initially only the first and second tear barriers 12, 13 projecting from the surface of the fabric 1 are stripped off, starting from an uppermost point of the convexly rounded surface 14, before the fine structure lying underneath (formed by the first warp and weft threads 2, 4 described in FIG. 1) of the fabric 1 are attacked, thus appreciably improving the pressure durability of the airbag in a crash situation.

Figure 5:
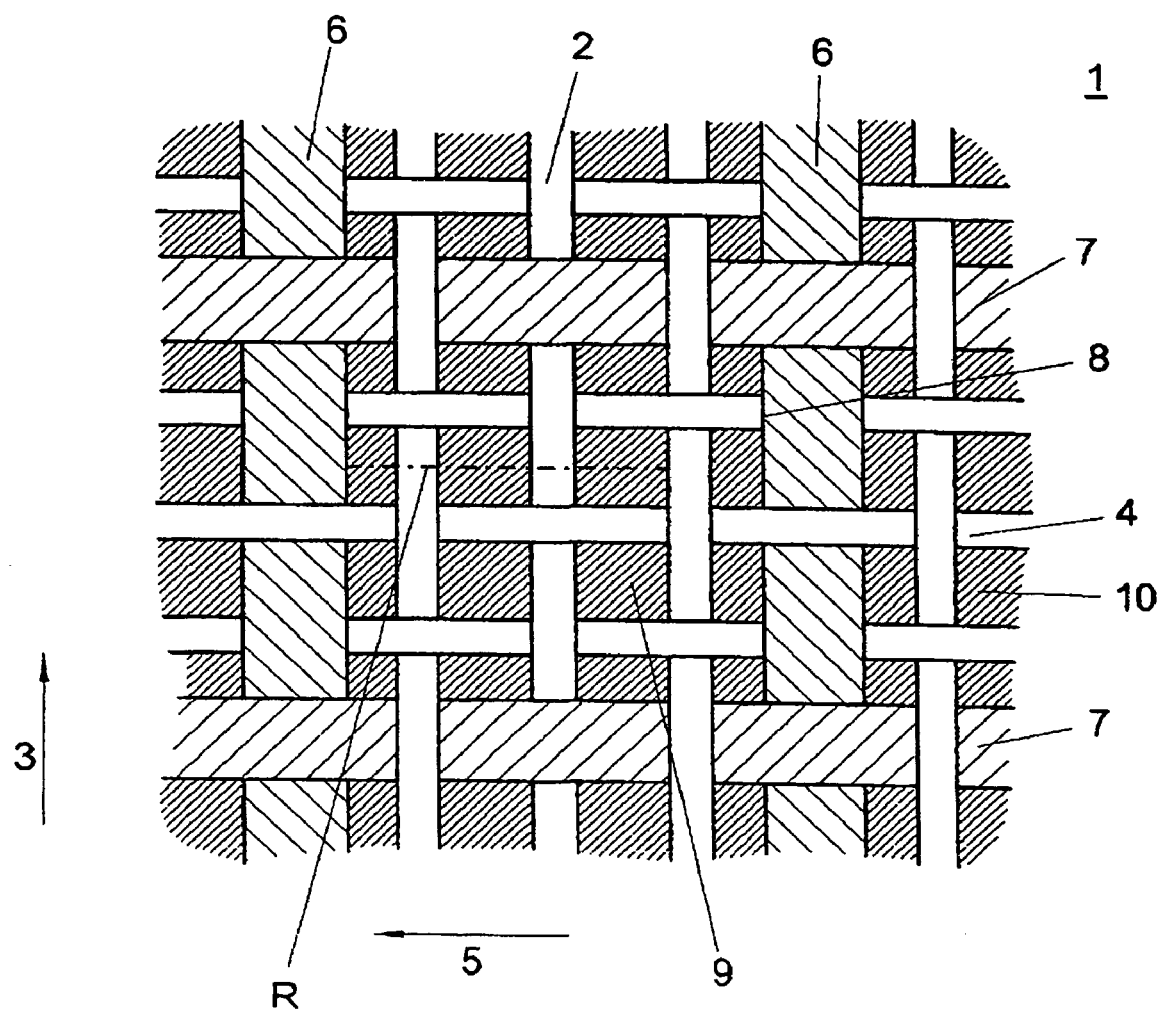
FIG. 5 shows a top view of a detail of a further variant of a fabric according to one embodiment of the present invention for an airbag with tear barriers in the form of additional threads having a larger cross-sectional area.

FIG. 5 shows a top view of a sheet-like fabric 1 for an airbag, which extends in a plane of extent lying in the paper plane. The fabric 1 has first warp threads 2 which run parallel to one another and, extending longitudinally, in a first longitudinal extent direction 3 (lying in the plane of extent).

Furthermore, the fabric 1 has first weft threads 4 which run parallel to one another and which run, extending longitudinally, along a second longitudinal extent direction 5 lying in the plane of extent, the second longitudinal extent direction 5 being, in particular, perpendicular to the first longitudinal extent direction 3.

The first warp and first weft threads 2, 4 are illustrated by way of example in FIG. 5 and in a way known from the description relating to FIG. 1.

In addition, the fabric 1 has second warp threads 6 and second weft threads 7. In this case, the second warp threads 6 are both arranged parallel to one another and arranged parallel to the first warp threads 2 and run, extending longitudinally, in the first longitudinal extent direction 3. A plurality of first warp threads 2 (for the sake of simplicity, FIG. 5 illustrates only three first warp threads 2 between the two second warp threads 6 illustrated) lie in each case between two adjacent second warp threads 6. The resistance of the fabric 1 can be controlled in particular by the density of the second warp threads 6 (and of the second weft threads 7). It is conceivable that the number of first warp threads 2 which are arranged in each case between two second warp threads 6 varies over several orders of magnitude.

The second weft threads 7 are likewise arranged both parallel to one another and parallel to the first weft threads 4. In this case, the second weft threads 7 run, extending longitudinally, in the direction of the second longitudinal extent direction 5 and, in particular, perpendicularly with respect to the second warp threads 6. A plurality of first weft threads 4 are arranged in each case between two adjacent second weft threads 7. For the sake of clarity, once again, only three first weft threads 4 are illustrated; however, as described above with reference to the first warp threads 2, the number may vary over orders of magnitude.

The first and the second warp threads 2, 6 are connected to the first and the second weft threads 4, 7 by a linen weave. In this case, a first or second weft thread 4, 7 crosses the first or second warp threads 2, 6 alternately below and above (in respect of a direction oriented perpendicularly to the plane of extent of the fabric 1).

The first warp and weft threads 2, 4 form a fine structure, whereas the second warp and weft threads 6, 7 form a coarser coarse structure, that is to say a square first cell 8, which is formed by two adjacent second warp threads 6 running parallel to one another and by two second weft threads 7 adjacent to one another and crossing the two first warp threads 6 perpendicularly, has a larger area than a square second cell 9, which is formed by two adjacent first warp threads 2 and two adjacent first weft threads 4 which cross the two first warp threads 2 perpendicularly.

The second warp threads 6 and the second weft threads 7 form, in particular, a square grid. This is essentially due to the fact that, in each case between two second adjacent warp threads 6 and two second adjacent weft threads 7, an identical plurality of first warp or weft threads 2, 4 are arranged (to be precise, three) which are arranged equidistantly in a direction perpendicular to their respective longitudinal extent direction. It is thus possible, in the case of a corresponding arrangement of the second warp and weft threads 6, 7, that these form a predeterminable (general) rectangular grid.

The second warp and weft threads 6, 7 differ from the first warp and weft threads 2, 4, above all, in a larger cross-sectional area, thus bringing about a higher resistance, as compared with the first warp and weft threads 2, 4. The resistance of those second warp and weft threads 6, 7 is designed, in particular, in such a way that the additional second warp and weft threads 6, 7 form tear barriers which restrict an expansion of tears R occurring, crash-induced, in the fabric 1, for example in the first cell 8, to that first cell 8 only (such a tear R is illustrated by way of example as a dashed and dotted line in the cell 8; it is clear in this case that a tear may have even more complex non-linear structures).

It is clear that the fine structure 2, 4 of the fabrics 1 described in FIGS. 1 to 5 may also be formed by more complex interlinkings of warp and weft threads. In particular, it is conceivable to provide a gas-tight envelope for an airbag consisting of a film-like sheet structure with the tear barriers 11 and/or the first and second tear barriers 12, 13 described.

Furthermore, it is an idea of the invention to use the fabrics described herein for an airbag in or on a motor vehicle for the protection of persons. For example, the fabric described herein may be used to form a side curtain type airbag such as disclosed in U.S. Pat. No. 6,264,234 (mentioned above).

The German Priority Application 10 2005 019 228.9, filed Apr. 20, 2005 including the specification, drawings, claims and abstract, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An airbag fabric comprising warp and weft threads, and a first tear resisting thread positioned parallel to the warp threads and a second tear resisting thread positioned parallel to the weft threads, wherein the cross-sectional area of each of the first and second tear resisting threads is greater than the cross-sectional area of each of the warp and weft threads.

2. The fabric of claim 1, wherein the warp, weft, first tear resisting and second tear resisting threads are connected in a linen weave.

3. The fabric of claim 1, further comprising an island shaped tear barrier positioned on the surface of at least one of the warp, weft, first tear resisting or second tear resisting threads threads.

4. The fabric of claim 1, wherein the island shaped tear barrier comprises silicone.

5. The fabric of claim 1, wherein the tear resisting threads form a rectangular grid.

6. An airbag fabric comprising a mesh of warp and weft threads, and a plurality of tear barriers positioned on the threads, wherein each of the tear barriers is a separate island shaped structure.

7. The fabric of claim 6, wherein the tear barrier comprises an elastic material applied to the mesh of warp and weft threads.

8. The fabric of claim 7, wherein the elastic material comprises silicon.

9. The fabric of claim 7, wherein the tear barriers have a generally circular contour in the plane of the mesh of warp and weft threads.

10. The fabric of claim 6, wherein the tear barriers are positioned on nodes of a triangular grid.

11. The fabric of claim 6, wherein the tear barriers are positioned on nodes of a rectangular grid.

12. The fabric of claim 6, wherein the tear barriers are positioned on nodes of a hexagonal grid.

13. The fabric of claim 6, wherein the tear barriers are positioned on a first surface of the mesh of threads to thereby provide protection against abrasion.

14. The fabric of claim 13, further comprising a coating formed on a second surface of the mesh of threads, wherein the second surface is on an opposite side of the mesh from the first surface.

15. The airbag fabric of claim 6, further comprising a first tear resisting thread positioned parallel to the warp threads and a second tear resisting thread positioned parallel to the weft threads, wherein the cross-sectional area of each of the first and second tear resisting threads is greater than the cross-sectional area of each of the warp and weft threads.

16. The airbag fabric of claim 13, wherein the exterior surface of the tear barriers facing away from the mesh has a convex curvature.

17. An airbag comprising:
a woven fabric including warp and weft threads;
a tear barrier including elastic material applied to a surface of the fabric in a plurality of island-shaped structures;
wherein the elastic material is applied at nodes of a geometric grid.

18. The airbag of claim 17, further comprising a coating applied to another surface of the fabric on an opposite side of the fabric from the elastic material.

19. The airbag of claim 17, wherein the woven fabric further comprises a first tear resisting thread positioned parallel to the warp threads and a second tear resisting thread positioned parallel to the weft threads, wherein the cross-sectional area of each of the first and second tear resisting threads is greater than the cross-sectional area of each of the warp and weft threads.

20. An airbag comprising a woven fabric including warp and weft threads, and a first tear resisting thread positioned parallel to the warp threads and a second tear resisting thread positioned parallel to the weft threads, wherein the cross-sectional area of each of the first and second tear resisting threads is greater than the cross-sectional area of each of the warp and weft threads.

* * * * *